Patented Apr. 23, 1929.

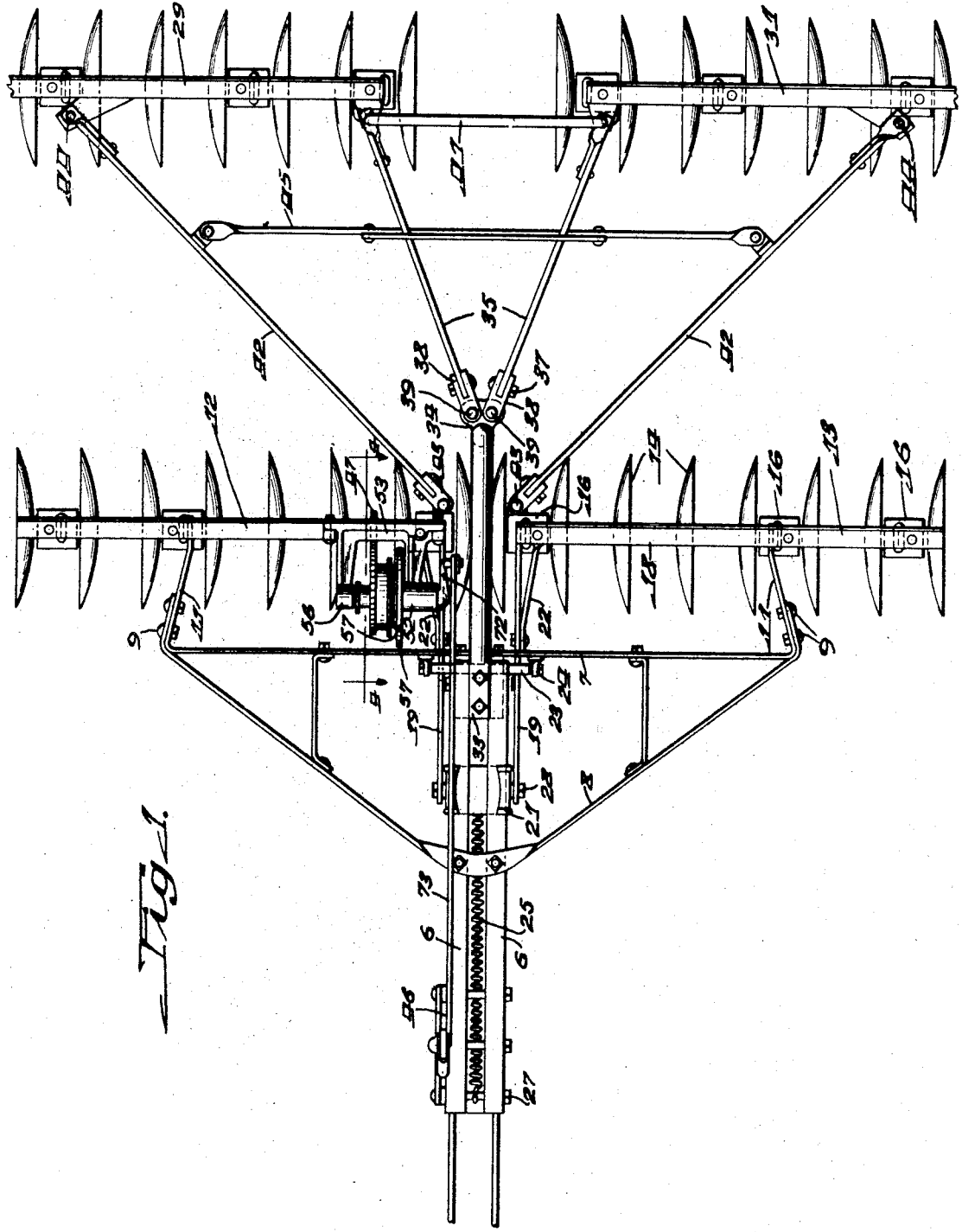

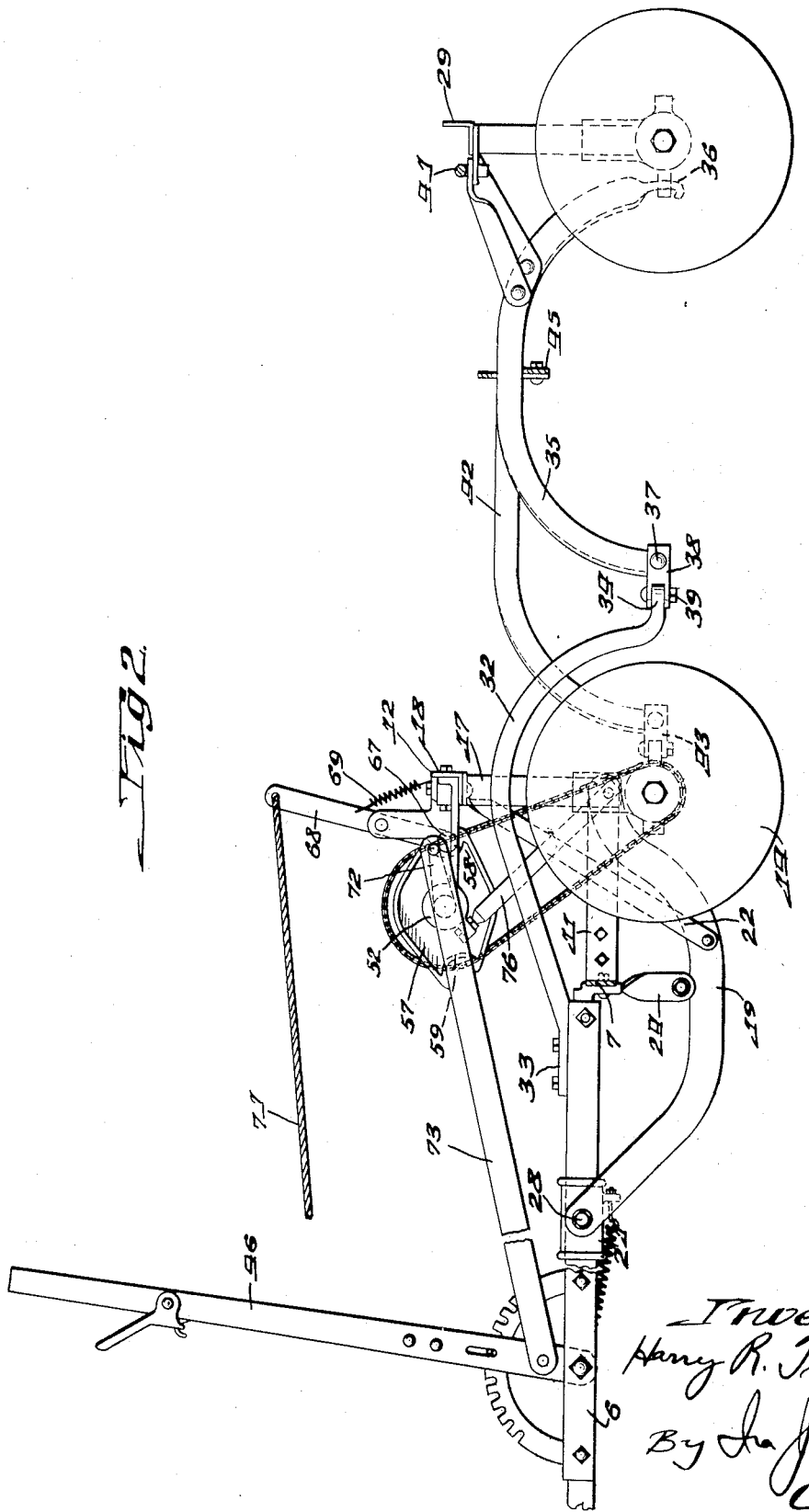

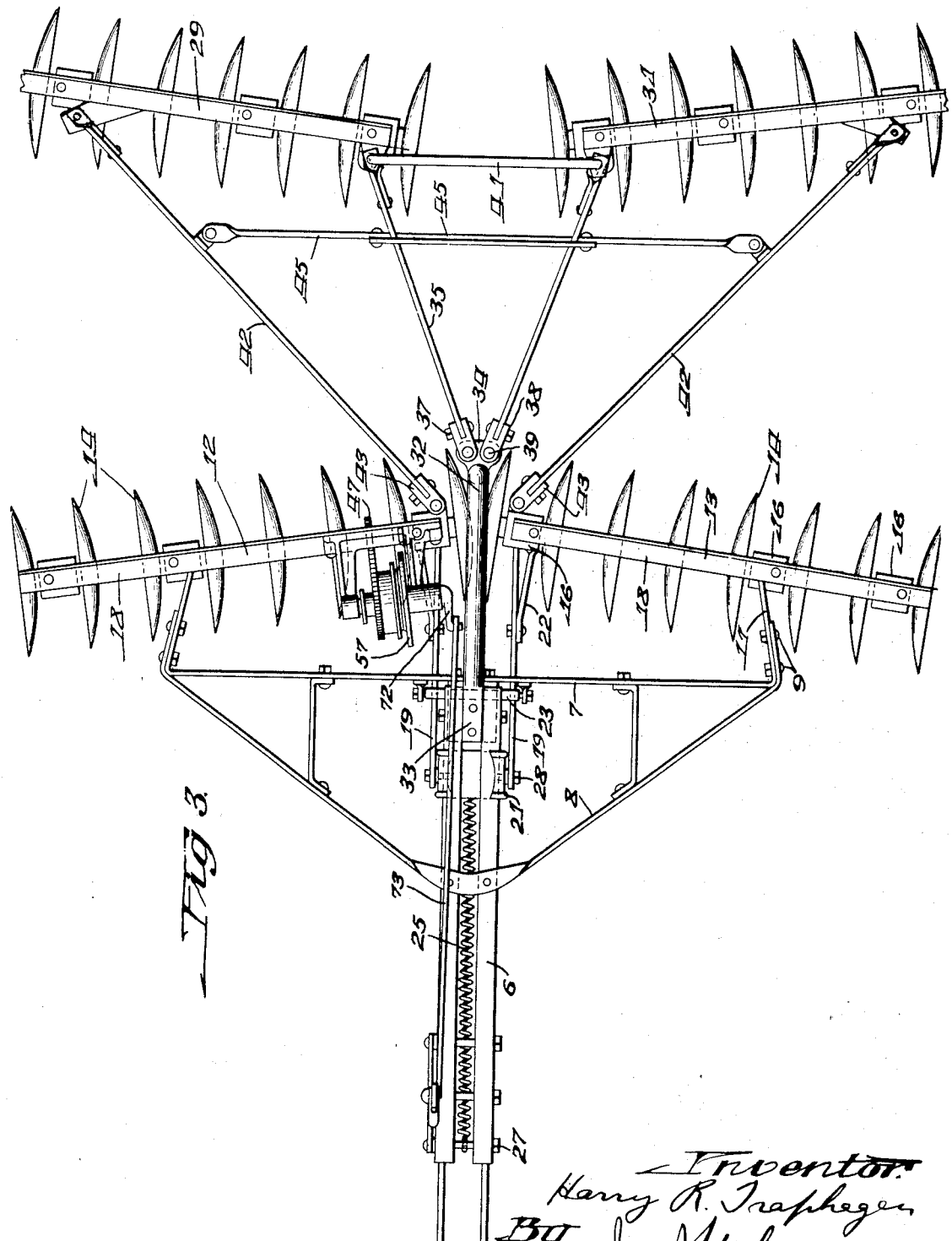

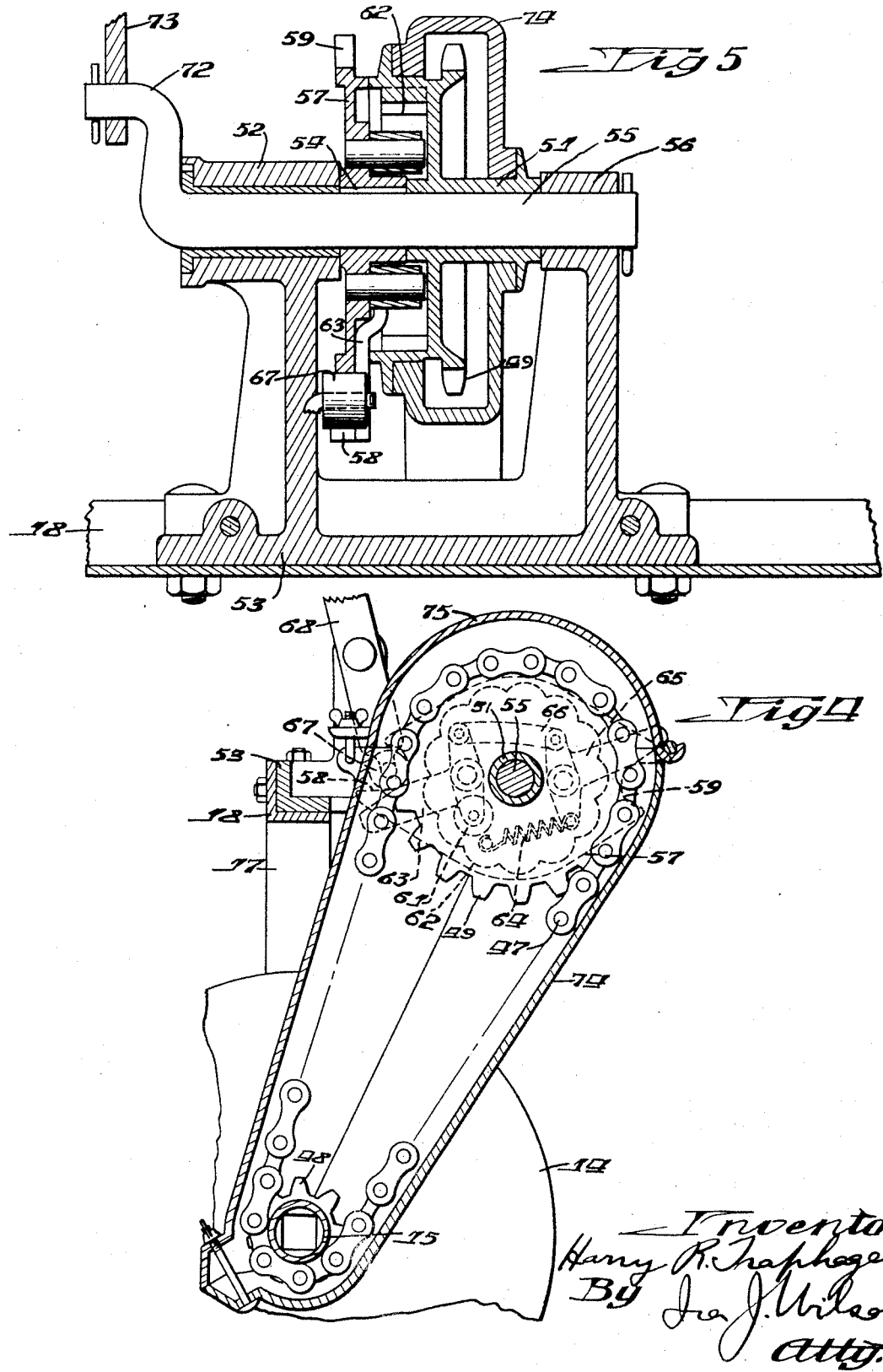

1,710,124

UNITED STATES PATENT OFFICE.

HARRY R. TRAPHAGEN, OF ROCKFORD, ILLINOIS, ASSIGNOR, BY MESNE ASSIGNMENTS, TO J. I. CASE THRESHING MACHINE COMPANY, OF RACINE, WISCONSIN, A CORPORATION OF WISCONSIN.

HARROW.

Application filed March 25, 1921. Serial No. 455,396.

This invention relates in general to harrows, and has more particular reference to tractor harrows, that is those adapted to be drawn by a tractor.

In this class of implements, it is desired to cause the harrow sections to be angled with respect to the line of draft by operation from a point remote from the harrow, preferably from the tractor. The chief object, therefore, of the present invention is to provide novel means for so causing the harrow sections to be angled. To this end, I have aimed to provide mechanism so constructed that an operator on the tractor may, by simple operation of a control member, such for example as by pulling a cord, cause the harrow sections to be moved out of alignment to an angular working position as the harrow travels forwardly, and upon a second actuation of such control member, cause the sections to be returned to a transport position in which they are in alignment.

My invention also contemplates broadly the provision of mechanism operated by traction of one or more ground members for causing the harrow sections to be angled with respect to the line of draft. In the case of a rotary disk harrow, I prefer that this source of power from traction shall be derived from rotative movement of one of the harrow sections. I have, therefore, shown in the present application, one working example of my invention in which power is derived from one of the disk sections is employed for angling not only the front sections, but also the rear sections in the event that the harrow is of the tandem type.

I have also aimed to provide in a harrow of the character described, mechanism adapted to be operated either by power or by hand for angling the harrow sections with respect to the line of draft.

Another object is to provide a harrow of generally improved construction, including novel connections between the front and rear harrow sections and the draft frame, and between the front and rear sections for causing them to be angled in predetermined relative relation. I have also provided novel means for maintaining the rear harrow sections in operative position during operation.

Other objects and attendant advantages will be appreciated as the invention becomes better understood by reference to the following description when considered in connection with the accompanying drawings, in which—

Figure 1 is a plan view of a tandem harrow embodying my invention, showing the harrow sections in alignment;

Fig. 2, an enlarged side elevation of the harrow as shown with the sections in alignment;

Fig. 3, a plan view of the harrow with the sections angled with respect to the line of draft;

Fig. 4, an enlarged sectional view taken substantially on the line 4—4 of Fig. 1; and Fig. 5, a horizontal sectional view through the clutch mechanism shown in Fig. 4.

The main draft frame comprises in the present instance, a tongue structure made up of channel bars 6 suitably bolted together and secured in spaced relation and laterally extending frame bars 7 and 8 fixed to the channel bars 6 and united at their outer ends by the bolts 9. The ends 11 of the rearwardly turned frame bar 7 may be pivotally connected in any suitable manner to the front harrow sections or gangs designated generally by 12 and 13. By reason of these pivotal connections medially of the respective harrow sections, the latter are each capable of swinging horizontally about such connections to permit angling of the sections with respect to the line of draft. The harrow sections per se may be of any suitable or preferred construction, and in the present instance each consists of a plurality of disks 14 fixed to a sleeve or axle 15 which revolves in bearings 16, held in rigid relative relation by a suitable frame comprising upright members 17 and a top bar 18. Each front harrow section is pivotally connected at its inner end by means of a drag bar 19, to a sleeve-like block 21 slidable lengthwise upon the tongue structure 6.

Brace bars 22 between the drag bars 19 and the top bars 18, serve to hold each harrow frame in upright position. When in operation the inner ends of the front harrow sections are held down in working position by the roller 23, which carried by the depending brackets 24, overlies the horizontal portions of the drag bars and takes the upward thrust. By means of a contractile coil spring 25 between the channel bars of the tongue structure 6 and connected at one end to the bolt 27, and at its opposite end to the bolt 28 on the block 21, the front harrow sections will be constantly urged into aligned position, as shown in Fig. 1.

The rear harrow sections 29 and 31 may be of any suitable or preferred construction, and in the present case are similar to the front sections. Novel means is provided for operatively connecting the rear sections to the main draft frame and to the front sections so that they will properly follow the latter both during straight-way travel and when turning corners. This means also provides a low point of draft, which insures better penetration of the rear disks or cutters. It also functions in combination with reach bars between the front and rear sections for causing the latter to be angled simultaneously with angling of the front sections. This means comprises a structure, preferably in the form of a goose neck draft bar 32 rigidly connected at its forward end 33 to the main draft frame and terminating at its rear end 34, at a point centrally between and at the rear of the front sections and at a relatively low point, preferably approximately in the plane of the horizontal axes of the disks. Rearwardly diverging arched draft bars 35 are pivotally connected at their rear ends 36 to the inner ends of the rear harrow sections and at their forward ends on horizontal pivots 37 to coupling members 38, in turn pivotally connected on vertical axes 39, to the rear end 34 of the goose neck draft bar. A transverse bar 41 holds the rear harrow sections in spaced relation. Rearwardly diverging reach bars 42 pivotally connected at their forward ends to the inner ends of the front harrow sections through the agency of couplings 43, similar to the couplings 38, and at their rear ends 44 to the outer ends of the rear harrow sections, serve to hold the front and rear sections in predetermined relation. A transverse bar structure 45 pivotally connected to the reach bars 42 and straddling the draft bars 35, constitute top and bottom stops for preventing vertical displacement of the inner ends of the rear harrow sections.

Referring now to the angling of the harrow sections, it should be understood that my invention contemplates broadly the provision of suitable means for accomplishing this purpose by power derived from the rotating disks. In the present example, I obtain this tractive power from the disks on one of the front harrow sections, although it should be understood that the disks of more than one section might be used, within the scope of the present invention. I have provided a device including driving and driven members, the former of which is continuously rotated by the disks of said section when the harrow is drawn forwardly and the latter connected to the draft frame; and by operatively connecting the driving and driven members in response to the actuation of a control member by the operator on the tractor, tractive power of the disks will be caused to angle the harrow sections a predetermined degree, whereupon said members will be disconnected, leaving the driven member locked in this position. Upon the next actuation of the control members, connection between the driving and driven members will be re-established for a given period in which to align the harrow sections by power. In the present example, the mechanism for accomplishing this purpose is interposed between the front harrow section 12 and an adjusting lever 46 on the draft frame. It comprises a sprocket chain 47 trained over a sprocket gear 48 fixed to the sleeve 15 and over a gear 49, the hub 51 of which is freely rotatable on the crank shaft 55, which is supported in the bearings 52 and 55 carried by the bracket 53. A driven member 57 fixed by means of a key 54 to the crank shaft 55 and and having diametrically opposed roller sockets 58 and 59, carries a roller 61 adapted to be engaged with the internally serrated face 62 of the gear or driving member 49. This roller 61 carried by a bell crank arm 63 pivotally mounted on the part 57, is adapted to be moved into engagement with the face 62 by means of a contractile spring 64, which operates the bell crank 63 through the agency of a similar bell crank lever 65 and intermediate link 66. A roller 67 carried by the lever 68 is adapted to enter the socket 58 of the driven part 57, as shown in Fig. 4, to thereby engage the outer end of the bell crank lever 63 so as to oscillate the same in a counter-clockwise direction and withdraw the roller 61 from engagement with the surface 62. A contractile spring 69 constantly urges the lever 68 in a direction to hold its roller 67 in contact with the member 57.

The foregoing describes briefly the parts of a clutch of well known construction used in farming implements for intermittently connecting and automatically disconnecting driving and driven members. Connection between the driving member 49 and the driven member 57 is established by pulling forwardly on a rope 71 attached to the lever 68, thereby withdrawing the roller 67 from the socket 58 and permitting the spring 64 to move the roller 61 or pawl into contact with the serrated face of the driving member. The member 57 will now be rotated by and with the member 49 until the roller 67 which follows the periphery of the member 57 enters the socket 59, thereby actuating the lever 65 and disengaging the clutch. It will be obvious that upon each successive pull of the rope 71 while the harrow is drawn forward, the part 57 will be rotated in half revolution movements. This driven part 57 being fixed to the sleeve 51, rotates the crank arm 72, which is fixed to the shaft 55. The crank arm is connected through the agency of a push-and-pull link 73 to the adjusting lever 46. From the foregoing, it will be manifest that as the crank arm 72 is rotated in a counter-clockwise direction viewing Fig. 2, in half revolution movements, it will cause the harrow section 21 to be swung forwardly and backwardly about its pivotal connection with the draft frame member 11. In this operation, it will be noted that the clutch mechanism is carried by and moves with the section 12. It will be further observed that the degree to which the section is angled will be determined by the throw of the crank arm 72, and that this degree of angling of the harrow section with respect to the line of draft may be varied by adjustment of the lever 46.

A suitable casing 74 is provided for housing the chain 47 and the clutch parts. This casing (not shown in Figs. 1 to 3 inclusive) may be of sectional construction as shown in Fig. 4, and includes a removable cover 75, permitting access to the clutch proper for inspection and service requirements. A brace 76 between the inner disk bearing bracket of the section 12 and the forward end of the bearing 52 serves to hold the clutch mechanism in fixed relation to the disk axis and is adjustable at its upper end for the purpose of tightening the chain.

The operation is as follows: The normal position with the harrow sections aligned for transportation is shown in Fig. 1. This position is maintained by the parts interposed between the harrow section 12 and the draft frame, including the lever 46, link 73, cap 72 and part 57, the latter of which is locked against rotation by the control lever 68. The other front harrow section 13 is held in alignment with the section 12, by reason of its connection with the latter through the agency of its drag bar 19 and the slide block 21. The rear harrow sections in turn are held in alignment by the reach bars 42 by reason of their connection with the inner ends of the front sections. When during operation it is desired to angle the harrow sections, the operator will pull the rope 71, thereby engaging the clutch and causing the crank arm 72 to be rotated in a counter-clockwise direction viewing Fig. 2, by tractive force from the rotating disks of the section 12. After a half revolution of the crank arm 72, the clutch will be automatically disengaged as explained above, and during this operation the inner ends of the front harrow sections will have been forced rearwardly by the crank action to the angled position shown in Fig. 3. At the same time, the rear harrow sections will be angled in the reverse direction by reason of the arrangement of the reach bars 42, so that the harrow sections will be properly set for operation. It will be observed, Fig. 3, that the front harrow sections have each a greater number of disks at the inner side of their respective vertical pivot axes, and that the rear sections have a greater number of disks at the outer side of their axes, so that the drag on the inner ends of the front sections and on the outer ends of the rear sections will, as the harrow travels forwardly, assist in angling the sections. This angling movement will lengthen the spring 25 so that considerable pressure will be stored up to be utilized in returning the sections to alignment. It will be obvious that when the control lever 68 is again actuated, the clutch will be engaged for rotating the crank 72 by tractive power from the front disks for re-aligning the harrow sections, this movement being assisted by the spring 25.

It will thus be seen that I have provided a self-contained mechanism associated with one of the harrow sections for utilizing the tractive power from certain of the ground elements for causing the sections to be moved into and out of alignment.

The mechanism described herein may also be operated by hand when the harrow is at rest for angling the harrow sections or for returning them to alignment, this being desirable under certain circumstances. This is done by the operator tripping the lever 68 and working the hand lever 46 forwardly and backwardly a number of times, causing the roller 61 to act as a ratchet to rotate by successive steps, the member 47 and consequently the crank 72, a half revolution. Thus, the harrow sections may be angled and aligned both by manual and tractive power through substantially the same mechanism.

It is believed that the foregoing conveys a clear understanding of the objects and principles of my invention, and while I have illustrated but a single working embodiment, it should be understood that various changes might be made in construction and arrangement without departing from the spirit and scope of the invention as expressed in the appended claims, in which—

I claim:

1. In a harrow, the combination of a draft frame, harrow sections connected therewith and adapted to be angled with respect to the line of draft, an adjusting lever on the draft frame, and mechanism operating between said lever and said sections and operated by rotative movement of one of the harrow sections for causing them to be angled.

2. A tandem harrow comprising a draft frame, front harrow sections medially attached to said frame, rear harrow sections, a goose neck draft structure attached to the frame and terminating at the rear of and centrally between the front sections substantially in the horizontal plane of their axes of rotation, draft bars connecting the rear end of said goose neck and the rear sections adjacent to their inner ends, reach bars connecting the inner ends of the front sections with the outer ends of the rear sections, and means for angling the harrow sections with respect to the line of draft.

3. A tandem harrow comprising a draft frame, front harrow sections medially attached to said frame, rear harrow sections, a goose neck draft structure attached to the frame and terminating at the rear of and centrally between the front sections substantially in the horizontal plane of their axes of rotation, draft bars connecting the rear end of said goose neck and the rear sections adjacent to their inner ends, reach bars connecting the inner ends of the front sections with the outer ends of the rear sections, means for angling the harrow sections with respect to the line of draft, and a transversely extending structure connecting said draft bars and reach bars for holding the inner ends of the rear harrow sections against vertical displacement.

4. A tandem disk harrow comprising a front pair of gangs, a rear pair of gangs, connections between the gangs, means for utilizing the rotating power of the disks to angle the gangs, and means for controlling said power operated angling mechanism arranged to be set into operation by a momentary movement of a control member and to be automatically stopped after the gangs have been angled to the desired position.

5. A tandem disk harrow having a front pair of gangs, a rear pair of gangs, connections between the gangs, lever mechanism for angling the gangs into and out of working position, and means operated by the rotation of the disks for operating the lever mechanism, such means including a clutch mechanism arranged to be thrown into operation by a momentary movement of a controlling member and to be automatically thrown out of operation after the mechanism has moved the desired amount.

6. A tandem disk harrow comprising a front pair of gangs, a rear pair of gangs, and mechanism adapted to operate through successive cycles, said mechanism being operated by rotation of certain of the disks and with the gangs for moving them in one cycle of operation from a transport position to a working position in which the gangs are angled with respect to the line of draft and in the next succeeding cycle for returning them to the transport position.

7. In a harrow, the combination of a draft structure, front and rear harrow sections, and means connecting said sections with the draft structure including clutch mechanism operated by rotation of the disks of one of the sections for angling all of them with respect to the line of draft and for subsequently returning them to the transport position.

8. A harrow having a draft frame, a pair of gangs, and mechanism operating between the draft frame and gangs for angling the latter with respect to the line of draft comprising, a clutch mechanism having a driving and a driven member, means for rotating the driving member by rotation of the disks of one of the gangs, a crank connected to the driven member, and a connection between the crank and the draft frame including an adjusting lever, the degree to which the gangs will be angled being determined by the throw of the crank arm and adjustment of said lever.

9. A harrow having a draft structure, a pair of gangs, and mechanism operating between said draft structure and gangs operated by rotation of the disks of one of the gangs for moving the gangs to a working position in which they are angled with respect to the line of draft and for returning the gangs to a transport position, said mechanism operating through a lever which is adjustable to vary the degree of said angling movement.

10. A harrow having a draft structure, a pair of gangs, and mechanism operating between said draft structure and gangs operated by rotation of the disks of one of the gangs for moving the gangs to a working position in which they are angled with respect to the line of draft and for returning the gangs to a transport position, said mechanism operating through a lever which is manually operable for moving the gangs independently of the movement imparted by rotation of the disks.

11. In a harrow, the combination of harrow sections adapted to be moved back and forth between a working position in which they are angled with respect to the line of draft and a transport position in which they are substantially in alignment, and mechanism operated by rotative movement of the disks of one of said sections for positively moving them to said working position and from the latter to said transport position.

12. In a disk harrow, the combination of a frame structure, a pair of gangs pivotally connected thereto, a clutch mechanism mounted on one of the gangs and having a driving member adapted to be driven by rotation of the disks of said gang, a crank connection between the driven member of said clutch mechanism and the frame structure, and means for optionally engaging said clutch mechanism for causing the gangs to be moved back and forth between working and transport positions by rotation of said disks.

13. In a disk harrow, the combination of a pair of gangs, and mechanism operated by rotation of the disks of one of the gangs for angling them with respect to the line of draft, said mechanism including means adapted to be manually operated in a ratchet-like operation for moving the gangs similarly to but independently of the movement imparted by rotation of the disks.

14. A disk harrow having a draft frame, a pair of gangs, a rotary ground-engaging member constituting one of the elements of one of the gangs, a clutch device including a driving member driven by a sprocket chain on said ground-engaging member and a driven member adapted to be intermittently connected to the driving member, and connections whereby the operation of said driven member will angle the gangs with respect to the line of draft.

15. A disk harrow having a pair of gangs, a rotary ground-engaging member constituting one of the elements of one of the gangs, a clutch device including a driving member driven by a sprocket chain on said ground-engaging member and a driven member adapted to be intermittently connected to the driving member, and connections whereby the operation of said driven member will angle the gangs with respect to the line of draft and subsequently return them to a transport position.

16. A disk harrow of the type adapted to be controlled from a tractor, comprising a draft frame, a pair of gangs, a rotary ground-engaging member constituting one of the elements of one of the gangs, a clutch mechanism having a driving and a driven member, said driving member being rotated by said ground-engaging member, means adapted to be operated from a tractor or any remote point for causing said driving and driven members to be intermittently connected and disconnected, a crank operated by said driven member and connected with the frame, and connections whereby rotations of said crank will cause the gangs to be angled to a working position and returned to a transport position.

17. A disc harrow of the type adapted to be drawn by a tractor, having a pair of gangs, and mechanism for angling and straightening the gangs operated by power derived directly from rotation of the disks of one of the gangs.

18. A disk harrow having a draft frame, a pair of gangs each of which has a frame structure pivotally connected with the draft frame, a clutch mechanism mounted on the frame structure of one of the gangs and having a driving and a driven member adapted to be intermittently connected, a chain connection between said driving member and the disks of said gang whereby said driving member is continuously rotated by said disks when the harrow is drawn over the ground, and connections between the draft frame and gangs operated by a crank on the driven member for angling the gangs.

19. A tandem disk harrow comprising a draft frame, a front pair of gangs pivoted intermediate their ends to said frame, a slide block on the draft frame, links pivotally connecting the slide block with the front gangs at their inner ends, a rear pair of gangs, a goose-neck draft bar rigidly connected to the draft frame and terminating at its rear end at a point centrally between and at the rear of the front gangs and substantially in the horizontal plane of the axes of the gangs, rearwardly diverging draft bars pivotally connecting the inner ends of the rear gangs and the rear end of the goose-neck draft bar, means holding the rear gangs in spaced relation, rearwardly diverging reach bars pivotally connecting the inner ends of the front gangs and the outer ends of the rear gangs, and mechanism for shifting said slide block on the draft frame for angling the gangs with respect to the line of draft.

20. A tandem harrow comprising a draft frame, a front pair of gangs pivoted intermediate their ends to said frame, a rear pair of gangs, a draft bar structure rigidly connected to the draft frame extending rearwardly therefrom and terminating at its rear end at a point centrally between and at the rear of the front gangs and substantially in the horizontal plane of the axis of the gangs, rearwardly diverging draft bars pivotally connecting the inner ends of the rear gangs and the rear end of said draft bar structure, rearwardly diverging reach bars pivotally connecting the inner ends of the front gangs and the outer ends of the rear gangs, and means operating between the draft frame and the front gangs for angling both the front and rear gangs with respect to the line of draft.

21. A disk harrow having a draft frame, a pair of gangs, and mechanism operated by rotation of the disks of one of the gangs and optionally put into operation to angle the gangs with respect to the line of draft in one operation and to return the gangs to transport position in another operation.

22. In a disk harrow, the combination of a pair of disk gangs, and mechanism for positively moving the gangs to both working and transport positions by the rotation of the disks of one of the gangs.

23. An agricultural implement of the type adapted to be controlled from a tractor, comprising a draft frame, a unit having earth working means rotatable about a horizontally disposed axis, said unit being mounted on the draft frame to oscillate about a vertically disposed axis, and mechanism mounted on the said unit operated by rotation of said earth working means and connected with the draft frame for positively moving the unit back and forth to different positions.

HARRY R. TRAPHAGEN.